June 18, 1968  H. GROS ET AL  3,388,684

DRIVE INSTALLATION FOR HYDROPLANES OR AIRFOIL WING BOATS

Filed Dec. 20, 1965  2 Sheets-Sheet 2

INVENTORS
HERMANN GROS
WALTER SCHWEIZER

BY Dicke + Craig
ATTORNEYS

United States Patent Office 3,388,684
Patented June 18, 1968

3,388,684
DRIVE INSTALLATION FOR HYDROPLANES OR
AIRFOIL WING BOATS
Hermann Gros, Friedrichshafen, and Walter Schweizer,
Immenstaad (Bodensee), Germany, assignors to May-
bach Mercedes-Benz Motorenbau Gesellschaft mit
beschrankter Haftung, Friedrichshafen, Germany
Filed Dec. 20, 1965, Ser. No. 514,993
19 Claims. (Cl. 115—34)

ABSTRACT OF THE DISCLOSURE

A drive installation for boats having a hull and hydrodynamic surfaces for lifting the hull substantially clear of the water within a predetermined speed range, such as hydrofoils and hydroplanes, having an internal combustion engine, preferably a Diesel engine, drivingly connected to the propeller shaft by means of parallelly connected hydrodynamic torque converter and direct drive friction clutch. A reversing gear or reversing guide vane for the torque converter may be provided for backing the boat.

Background of the invention

In water vehicles, the torque input of the propeller depends, in addition from the rotational speed, also from the travel or moving resistance. In ships with strongly differing travel resistances conditioned by the operation thereof, for example, with tugs, fishing boats or ice breakers, and provided with internal combustion engines, especially Diesel engines as driving engines, change-speed gears with several speed-reduction ratios or electrical transmission installations for the increase of the torque produced by the engine and for the operation of the engine with maximum output also at smaller propeller rotational speeds are installed between the engine and the propeller.

The present invention relates to a drive installation for hydroplanes or airfoil wing boats whose travel resistance increases rapidly with increasing velocity, with an immersed boat body during starting, decreases when the boat body emerges or lifts out of the water, and increases again with a further velocity increase. With a propeller rotational speed proportional approximately to the travel velocity, the curve of the input torque of the propeller corresponds approximately to the curve of the travel resistance.

With hydroplanes, one seeks to achieve velocities that are as high as possible, however, limits are imposed to an economic steady state or cruising travel velocity by flow-technical reasons.

In the interest of weight saving and above all of an economic operation, the rated output of the engine is to correspond to the input power of the propeller during steady or cruising travel velocity.

It is possible that the increased torque requirement of the propeller during emerging or lifting out of the water cannot be satisfied by the driving engine at a relatively lower propeller rotational speed, i.e., the boat then cannot emerge or lift out of the water.

The conventional force transmission installations known with ships or boats for matching the torque produced by the engine to the strongly fluctuating torque requirement of the propeller are not suited for hydroplanes.

With the mechanical change-speed transmissions which are shifted, for the most part, at the power levels in question by means of claw or teeth clutches, the transmission of torque is interrupted during the shifting operation. During shifting from the transmission ratio increasing the torque to the transmission ratio of a higher rotational speed after the boat emerges or lifts out of the water, the boat velocity would decrease instantly owing to this interruption and the boat would re-enter or immerse again into the water.

The electrical force transmission systems are complicated and expensive and cannot be considered for hydroplanes anyhow by reason of the large weight thereof.

Summary of the invention

It is the purpose of the present invention to create a simple and light weight force transmission for hydroplanes which can satisfy the torque requirement of the propeller under all operating conditions and which avoids the disadvantages of the known transmissions.

This is achieved in accordance with the present invention by a hydrodynamic torque converter between the internal combustion engine, for example, a Diesel engine, and the propeller shaft for the increase of the torque produced by the Diesel engine to the higher propeller torque required during the starting of the immersed boat and for the operation of the Diesel engine with maximum output at highest rotational speed during the emerging of the boat.

Special advantages are offered by a torque converter with centripetal turbine having a decreasing torque input with increasing output rotational speed and with its efficiency maximum at an output rotational speed which corresponds approximately to the propeller rotational speed during emerging or lifting of the boat out of the water.

With hydroplanes for special applications, of which are demanded, in addition to an economic steady or cruising travel velocity, temporary increased velocities and which are, for that reason, equipped with a further internal combustion engine, for example, a gas turbine adapted to be connected with the propeller shaft, according to a further feature of the present invention, the gas turbine is adapted to be coupled with the propeller shaft, possibly by a change-speed gear for matching the gas turbine rotational speed to the propeller rotational speed, and the rotational speed ratio of the output shaft to the input shaft of the torque converter suffices with adequate torque converter efficiency beyond the value of 1, so that the maximum rotational speed of the Diesel engine is not exceeded with increased propeller rotational speed.

Additionally, a friction clutch for bridging the torque converter is arranged in the drive installation of the present invention for an economic operation thereof after the boat lifts out of the water during normal travel operation.

Accordingly, it is an object of the present invention to provide a drive installation for hydroplanes or hydrofoils which is simple in construction yet avoids the aforementioned shortcomings and drawbacks encountered with the known drive systems.

It is another object of the present invention to provide a drive installation from the internal combustion engine, especially a Diesel engine to the propeller shaft of a hydroplane or the like which assures sufficient torque under all operating conditions including the period of time during which the hydroplane lifts out of the water while permitting economic operation of the internal combustion engine.

A further object of the present invention resides in a drive installation for hydroplanes or the like which is light in weight, assures economic operation under all operating conditions that may occur, and permits a good matching of the engine characteristics to the torque requirements of the propeller shaft, even in case of temporary requirements for greater than normal cruising speeds.

Brief description of the drawing

These and further objects, features, and advantages of the present invention will become more obvious from the following description when taken in connection with the accompanying drawing which shows, for purposes of illustration only, several embodiments in accordance with the present invention, and wherein:

FIGURE 3 is a somewhat schematic view, partly in cross section, of a first embodiment of a drive installation in accordance with the present invention, taken along line 3—3 of FIGURE 3a;

FIGURE 4 is a somewhat schematic view, partly in cross section, of a further modified embodiment of a drive installation in accordance with the present invention, taken along line 4—4 of FIGURE 4a.

Detailed description of the drawing

Figure 1:
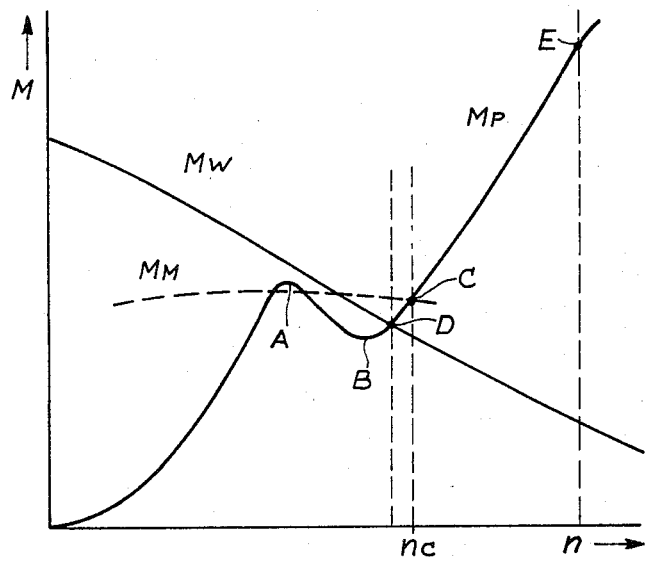
FIGURE 1 is a diagram indicating the torque input curve plotted against rotational speed of a propeller in a hydroplane during different operating conditions.

Referring now to the drawing wherein like reference numerals are used throughout the various views to designate like parts, and more particularly to the diagram of FIGURE 1, reference character $M_p$ designates the curve of the propeller torque, with the torque M, along the ordinate, plotted against the propeller rotational speed $n$, along the abscissa. The boat velocity is approximately proportional to the propeller rotational speed. During starting, the propeller torque increases steeply with increasing boat velocity corresponding to the increasing boat resistance and reaches a first maximum value A prior to the lifting or emerging of the boat out of the water. As a result of the resistance decrease during gradual emerging or lifting out of the water, the torque input of the propeller decreases notwithstanding the increasing boat velocity and propeller rotational speed, is lowest at point B with the boat body just completely lifted out of the water and increases again with increasing boat velocity.

The economic steady state or cruising travel velocity, limited for the boat for flow-technical reasons such as cavitation at the wings, is achieved at C with a propeller rotational speed $n_C$. The driving engine is so dimensioned and rated for reasons of an economic operation and of a low weight that its steady state rated output corresponds exactly to the propeller input power at this boat velocity. The engine torque curve $M_M$, possibly reduced to the propeller shaft, intersects the propeller curve $M_p$ at point C corresponding to the design starting point. It is visible from FIGURE 1 that with a fixed transmission ratio between engine and propeller, the propeller torque necessary when the boat begins to emerge or lift out of the water at point A, then cannot be supplied by the engine.

By reason of the torque converter installed in accordance with the present invention between the engine and propeller shaft, the engine can be operated at its normally rated power output with a steady velocity from standstill of the propeller to its rotational speed $n_C$. The torque converter output torque $M_W$ is, therefore, available at the propeller shaft which lies above the torque requirement $M_p$ of the propeller up to the point of intersection D with the propeller curve near to the steady or cruising velocity. At point D, the torque converter is by-passed or bridged by the friction clutch arranged according to the present invention in the driving installation whence the torque converter losses are eliminated and now the higher engine torque is available to the propeller shaft within this range.

In hydroplanes for special applications, which are intended to reach temporarily a considerably higher velocity than the economic steady or cruising velocity and which are equipped for that purpose with an additional driving engine, for example, with a gas turbine, the gas turbine is appropriately adapted to be coupled directly to the propeller shaft, possibly by way of a matching transmission. The advantage results thereby from the torque converter arranged in accordance with the present invention between the driving engine and the propeller shaft that with an opened or disengaged again by-pass clutch, the driving engine can be continued to be operated at its normally rated output with constant rotational speed, i.e., within its economic operating range. The torque converter is so constructed in accordance with the present invention that its output rotational speed exceeds the input rotational speed with still good efficiency whereby the output torque of the torque converter further decreases with increasing propeller rotational speed as indicated by the curve $M_W$. The lacking torque between curves $M_W$ and $M_p$ is now supplied by the gas turbine until the maximum output of the gas turbine and therewith the maximum propeller rotational speed and boat velocity is reached at E.

Figure 2:
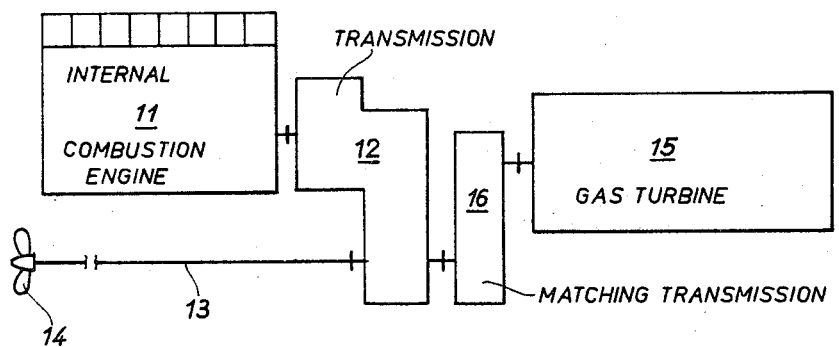
FIGURE 2 is a schematic diagrammatic view of a drive installation in accordance with the present invention for hydroplanes provided with a gas turbine adapted to be selectively connected to the propeller shaft.

The drive installation of a hydroplane is schematically indicated in FIGURE 2. An internal combustion engine, preferably a Diesel engine 11, drives by way of a transmission 12 the propeller shaft 13 having a propeller 14. For maximum velocities, a gas turbine 15 is adapted to be coupled with the propeller shaft 13 by way of a matching transmission 16.

Figure 3:
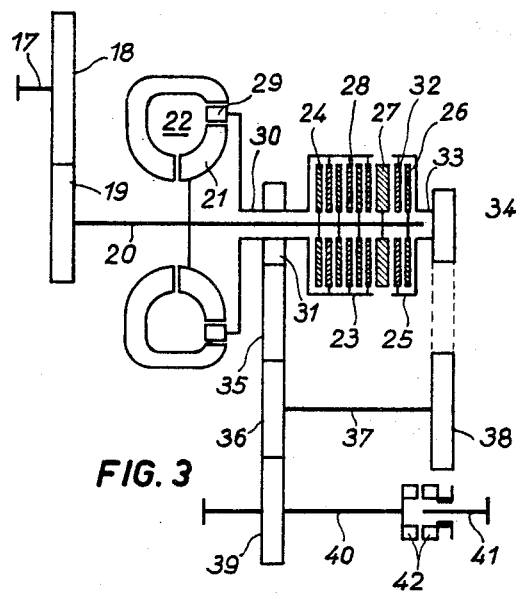
Figure 3A:
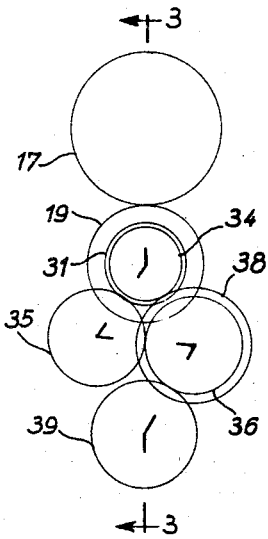
FIGURE 3a is a partial schematic right side elevational view of the drive installation of FIGURE 3.

FIGURES 3 and 3a illustrate one embodiment of the transmission between the Diesel engine 11 and the propeller shaft 13. The transmission input shaft 17 drives by way of a gear set 18/19 providing an overdrive the transmission main shaft 20. The torque converter pump wheel 21 of a hydrodynamic torque converter 22 is connected with the main shaft 20 so as to rotate in unison therewith; one-half of a friction clutch 23 having friction disks 24 and one-half of a further friction clutch 25 with a friction disk 26 are also connected with the main shaft 20. Both clutches 23 and 25 are combined into a double clutch and are shifted by means of a common pressure plate 27. The other half of the clutch 23 with the friction disks 28 thereof is operatively connected with the turbine wheel 29 of the torque converter 22 by means of a hollow shaft 30 arranged concentrically to the transmission main shaft 20. A gear 31 is securely mounted on the hollow shaft 30 for rotation in unison therewith by conventional means. The other half of the clutch 25 with a friction disk 32 is connected by means of a further hollow shaft 33 also arranged concentrically to the transmission main shaft 20 with a gear wheel 34. The gear 31 is in driving connection by way of an intermediate gear 35 with a gear 36 that is rigidly arranged on a transmission counter shaft 37. The gear 34 meshes directly with a gear 38 that is also arranged rigidly on the transmission counter shaft 37. A further gear 39 which is mounted on the transmission output shaft 40 meshes with the gear 36. A further shaft 41, arranged concentrically to the transmission output shaft 40, is adapted to be coupled with the transmission output shaft 40 by way of an over-riding or over-running clutch 42 of conventional construction whereby the further shaft 41 is driven from the gas turbine 15 by the matching transmission 16 (FIG. 2).

Both clutches 23 and 25 are disengaged for starting the hydroplane, and with a filled torque converter 22, the engine output is transmitted from the transmission input shaft 17 by way of the gear set 18/19, the transmission main shaft 20, the torque converter 22, the hollow shaft 30, gears 31, 35, 36, and 39 to the transmission output shaft 40. After the boat emerges or lifts out of the water, the clutch 23 is engaged whereby the torque converter 22 is by-passed so that now the engine output is transmitted purely mechanically from the transmission input shaft 17 by way of the gear set 18/19, transmission main shaft 20, clutch 23, hollow shaft 30, and gears 31, 35, 36 and 39 to the transmission output shaft 40. For a maximum velocity, the over-running clutch 42 is engaged which, during acceleration of the gas turbine 15, becomes effective approximately at rotational speed equality of the shaft 41 with the transmission output shaft 40, and the clutch 23 is again disengaged. As a result thereof, the output of the driving engine 11 and the output of the gas turbine 16 are now available to transmission output shaft 40.

For travelling rearwardly during the maneuvering of the boat, the clutch 25 is engaged. As a result thereof, the power train is realized purely mechanically from the transmission input shaft 17 by way of gear set 18/19, transmission main shaft 20, clutch 25, hollow shaft 33, gear set 34/38, transmission counter shaft 37, and gears 36, 39 to the transmission output shaft 40. Since neither height velocities are necessary for backward travel nor oes the hydroplane reach a gliding condition in backward travel, the propeller 14 does not require a high torque, and it is therefore not necessary to supply the torque by way of torque converter 22, and the clutch 25 can be dimensioned correspondingly small.

Figure 4:
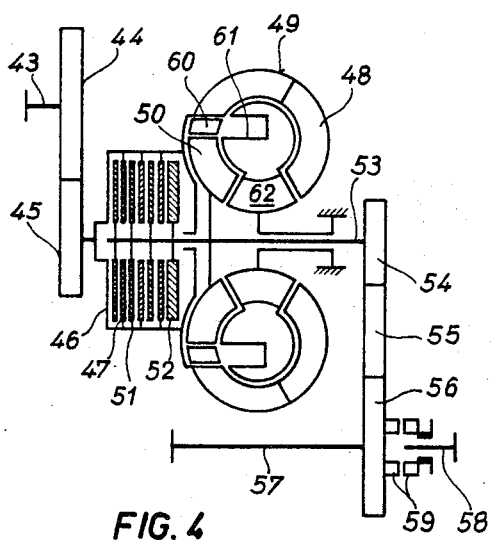
Figure 4A:
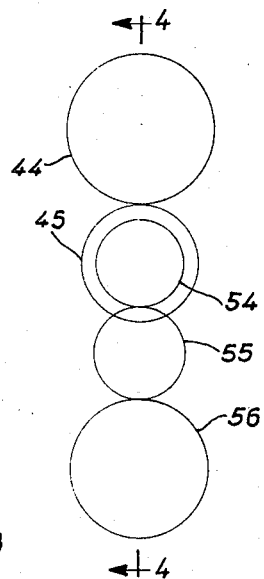
FIGURE 4a is a partial schematic right side elevational view of the transmission of FIGURE 4.

A further embodiment of the transmission between the engine and propeller shaft is illustrated in FIGURES 4 and 4a. This transmission contains, according to the present invention, a torque converter with centripetal turbine which makes possible a particularly economic operation of the drive installation, on the one hand, by a somewhat more favorable efficiency over the entire rotational speed range and on the other by the rotational speed depression of the engine with smaller torque converter output rotational speeds. The smaller torque conversion which is thereby accepted with small torque converter rotational speeds signifies in this application no disadvantage since a large torque excess to the propeller shaft exists already with the correspondingly small propeller rotational speeds.

As in the embodiment of FIGURE 3, the transmission input shaft 43 drives by way of a gear set 44/45, producing an overdrive, the one-half of a friction clutch 46 having friction disks 47 and the pump wheel 48 of a torque converter 49. The torque converter turbine wheel 50 as well as the second half of the friction clutch 46 provided with friction disks 51 and pressure plate 52 are connected with a transmission shaft 53 to rotate in unison therewith. Additionally, a gear 54 is rigidly mounted on the transmission shaft 53 which is in driving connection by way of a gear 55 with the gear 56 mounted on the transmission output shaft 57. As in the embodiment according to FIGURE 3, a further shaft 58 arranged concentrically to the transmission output shaft 57 is adapted to be coupled thereto by an over-running claw clutch 59, the further shaft 58 being driven from the gas turbine 15 by way of the matching transmission 16. In accordance with the present invention, a reverse guide wheel 60 adapted to be inserted into the hydraulic circuit is arranged in the torque converter 49. The reversing guide wheel 60 is disposed in the disengaged condition within a housing 61 within the core of the torque converter 49. The housing 61 is securely connected with the transmission housing by way of the guide wheel 62.

For starting, the friction clutch 46 is disengaged, and with filled torque converter 49, the engine output is transmitted from the transmission input shaft 43 by way of the gear set 44/45, torque converter 49, transmission shaft 53, gears 54, 55, and 56 to the transmission output shaft 57. After the boat emerges or lifts out of the water, the friction clutch 46 is engaged, the torque converter 49 is emptied in a conventional manner and the power train now takes place from the transmission input shaft 43 by way of the gear set 44/45, friction clutch 46, transmission shaft 53, gears 54, 55, and 56 to the transmission output shaft 57.

For higher velocities, as in the embodiment of FIGURE 3, the friction clutch 46 is disengaged, the torque converter 49 is again filled and the over-running claw clutch 59 is engaged which becomes operable at approximately rotational speed equality of the transmission output shaft 57 and the shaft 58.

For purposes of travelling backward, the friction clutch 46 and the over-running claw clutch 59 are both disengaged and the reverse guide wheel 60 of the torque converter 49 is inserted by conventional means into the hydraulic circuit. With filled torque converter 49, the engine output during starting is transmitted from the transmission input shaft 43 to the transmission output shaft 57 but the transmission shaft 53 and therewith also the transmission output shaft 57 rotate in the opposite direction of rotation as a result of the engaged reverse guide wheel 60.

While we have shown and described several embodiments in accordance with the present invention, it is understood that the same is not limited thereto but is susceptible of numerous changes and modifications as known to a person skilled in the art, and we therefore do not wish to be limited to the details shown and described herein, but intend to cover all such changes and modifications as are encompassed by the scope of the appended claims.

We claim:

1. A boat having a hull and hydrodynamic surface means for lifting the hull substantially clear of the water within a predetermined speed range, such as hydrofoils and hydroplanes, in combination with a drive installation, comprising internal combustion engine means, propeller shaft means having a propeller thereon and means including hydrodynamic torque converter means drivingly connected between the internal combustion engine means and the propeller shaft means for increasing the torque produced by the internal combustion engine means to the higher propeller torque necessary during the starting of the immersed boat and for the operation of said engine means with maximum output at maximum rotational speed during emerging of the boat out of the water.

2. A drive installation according to claim 1, wherein said engine means is a Diesel engine.

3. A drive installation according to claim 1, wherein said torque converter means includes centripetal turbine means having a decreasing torque input with increasing rotational speed of the output thereof and with its maximum efficiency at an output rotational speed corresponding approximately to said propeller rotational range when the boat lifts out of the water.

4. A drive installation according to claim 1, further comprising additional internal combustion engine means adapted to be additionally drivingly connected to the propeller shaft means for increasing the propeller rotational speed in case of increased velocity requirement of the boat substantially above said speed range, coupling means for drivingly coupling said additional engine means to said propeller shaft means, said torque converter means being operable in such a manner that the rotational speed ratio of the output shaft to the input shaft thereof is adequate with sufficient torque converter efficiency beyond a value of 1 in order that the maximum rotational speed of a first-mentioned engine means is not exceeded with increased propeller rotational speed.

5. A drive installation according to claim 1, further comprising additional gas turbine engine means adapted to be additionally drivingly connected to the propeller shaft means for increasing the propeller rotational speed substantially above said speed range in case of increased velocity requirement of the boat, coupling means for drivingly coupling said gas turbine engine means to said propeller shaft means including transmission means for matching the gas turbine engine means rotational speed to the propeller rotational speed, said torque converter means being operable in such a manner that the rotational speed ratio of the output shaft to the input shaft thereof is adequate with sufficient torque converter efficiency beyond a value of 1 in order that the maximum rotational speed of the first-mentional engine means is not exceeded with increased propeller rotational speed.

6. The drive installation according to claim 1, further comprising friction clutch means drivingly between said engine means and said propeller means for by-passing the torque coverter means during normal travel after the boat has lifted out of the water at speeds above said speed range.

7. The drive installation according to claim 1 further comprising reversing gear means drivingly between the torque converter means and the propeller shaft means to enable backing of the boat.

8. The drive installation according to claim 1, further comprising reversing guide wheel means in said torque converter means operable to be selectively inserted into the hydraulic circuit thereof to enable backing of the boat.

9. A drive installation according to claim 2, wherein said torque converter means includes centripetal turbine means having a decreasing torque input with increasing rotational speed of the output thereof and with its maximum efficiency at an output rotational speed corresponding approximately to said propeller rotational speed range when the boat lifts out of the water.

10. A drive installation according to claim 9, further comprising additional gas turbine engine means adapted to be additionally drivingly connected to the propeller shaft means for increasing the propeller rotational speed substantially above said speed range in case of increased velocity requirement of the boat, coupling means for drivingly coupling said gas turbine engine means to said propeller shaft means including transmission means for matching the gas turbine engine means rotational speed to the propeller rotational speed, said torque converter means being operable in such a manner that the rotational speed ratio of the output shaft to the input shaft thereof is adequte with sufficient torque converter efficiency beyond a value of 1 in order that the maximum rotational speed of the first-mentioned engine means is not exceeded with increased propeller rotational speed.

11. The drive installation according to claim 3 further comprising friction clutch means drivingly between said engine means and said propeller means for by-passing the torque converter means during normal travel after the boat has lifted out of the water at speeds above said speed range.

12. The drive installation according to claim 3, further comprising reversing gear means drivingly between the torque converter means and the propeller shaft means to enable backing of the boat.

13. The drive installation according to claim 3, further comprising reversing guide wheel means in said torque converter means operable to be selectively inserted into the hydraulic circuit thereof to enable backing of the boat.

14. The drive installation according to claim 4, further comprising friction clutch means drivingly between said engine means and said propeller means for by-passing the torque converter means during normal travel after the boat has lifted out of the water at speeds above said speed range.

15. The drive installation according to claim 4, further comprising reversing gear means drivingly between the torque converter means and the propeller shaft means to enable backing of the boat.

16. The drive installation according to claim 4, further comprising reversing guide wheel means in said torque converter means operable to be selectively inserted into the hydraulic circuit thereof to enable backing of the boat.

17. The drive installation according to claim 10, further comprising friction clutch means drivingly between said engine means and said propeller means for by-passing the torque means during normal travel after the boat has lifted out of the water at speeds above the speed range.

18. The drive installation according to claim 17, further comprising reversing gear means drivingly between the torque converter means and the propeller shaft means to enable backing of the boat.

19. The drive installation according to claim 17, further comprising reversing guide wheel means in said torque converter means operable to be selectively inserted into the hydraulic circuit thereof to enable backing of the boat.

References Cited

UNITED STATES PATENTS

| 1,662,301 | 3/1928 | Coykendall | 115—34 |
| 2,769,420 | 11/1956 | Horton et al. | 115—34 |
| 2,410,556 | 11/1946 | Ware | 74—661 |
| 2,449,608 | 9/1948 | Le May | 74—731 |
| 2,894,370 | 7/1959 | Lewis | 60—54 |
| 2,926,550 | 3/1960 | Stoeckicht | 74—675 |
| 2,932,950 | 4/1960 | Becker | 60—54 |
| 3,043,162 | 7/1962 | Kugel et al. | 74—732 |
| 3,055,169 | 9/1962 | Seibold | 60—12 |
| 3,194,087 | 7/1965 | Kronogard | 74—661 |

FOREIGN PATENTS 1,203,564   10/1965   Germany.

DONLEY J. STOCKING, *Primary Examiner.*

ARTHUR T. McKEON, *Examiner.*

J. R. BENEFIEL, *Assistant Examiner.*

UNITED STATES PATENT OFFICE
Certificate

Patent No. 3,388,684                                                             Patented June 18, 1968

Hermann Gros and Walter Schweizer

Application having been made by Hermann Gros and Walter Schweizer, the inventors named in the patent above identified, and Maybach Mercedes-Benz Motorenbau GmbH, Friedrichshafen, Germany, the assignee, for the issuance of a certificate under the provisions of Title 35, Section 256, of the United States Code, adding the name of Egon Faber as a joint inventor, and a showing and proof of facts satisfying the requirements of the said section having been submitted, it is this 10th day of February 1970, certified that the name of the said Egon Faber is hereby added to the said patent as a joint inventor with the said Hermann Gros and Walter Schweizer.

LUTRELLE F. PARKER
*Law Examiner.*